Oct. 7, 1952 M. E. McCLELLAN 2,612,979
BALE LOADER WITH WIDE PICKUP MEANS
Filed Feb. 2, 1950 2 SHEETS—SHEET 1
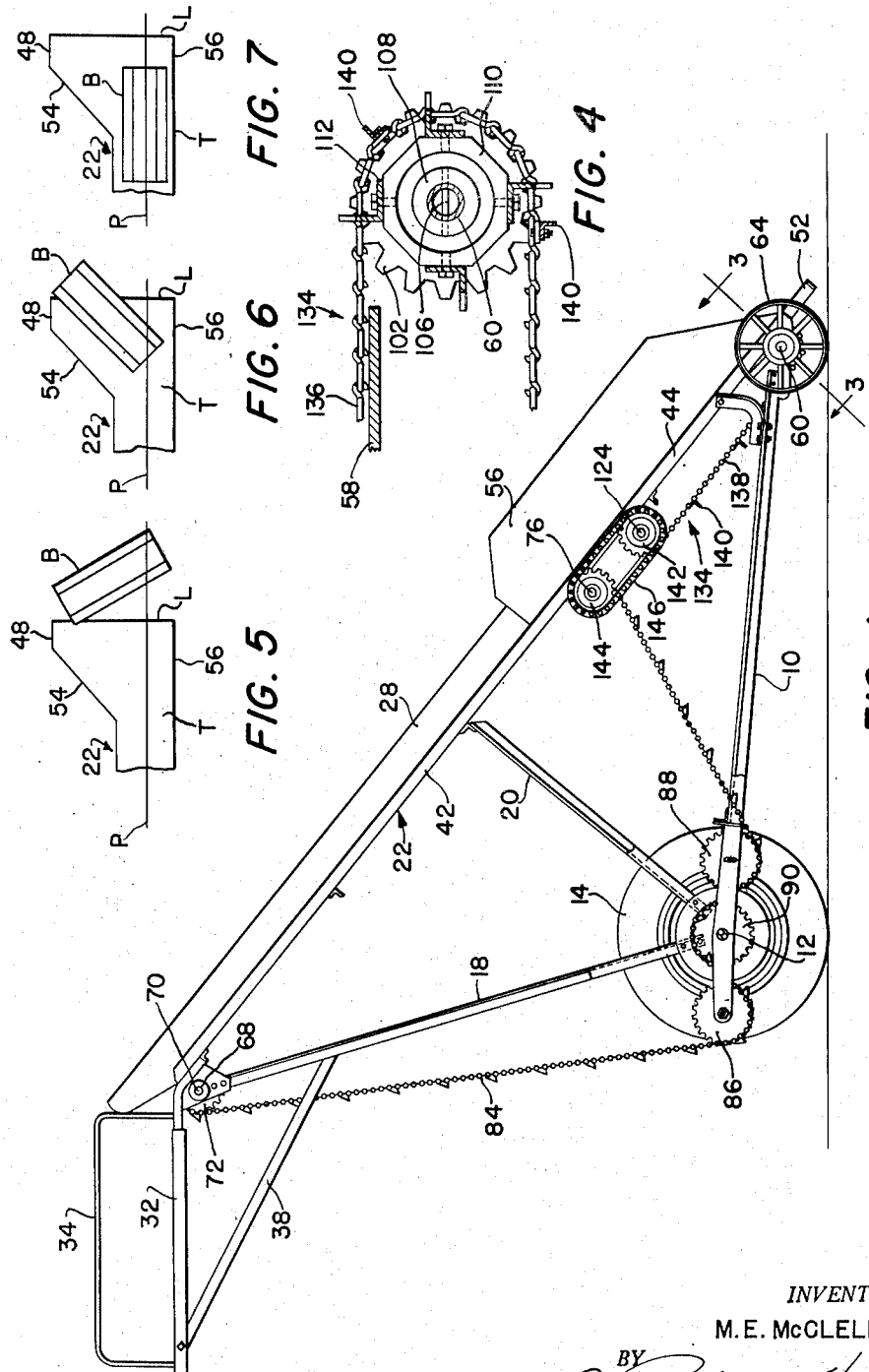
INVENTOR.
M. E. McCLELLAN
BY
ATTORNEYS

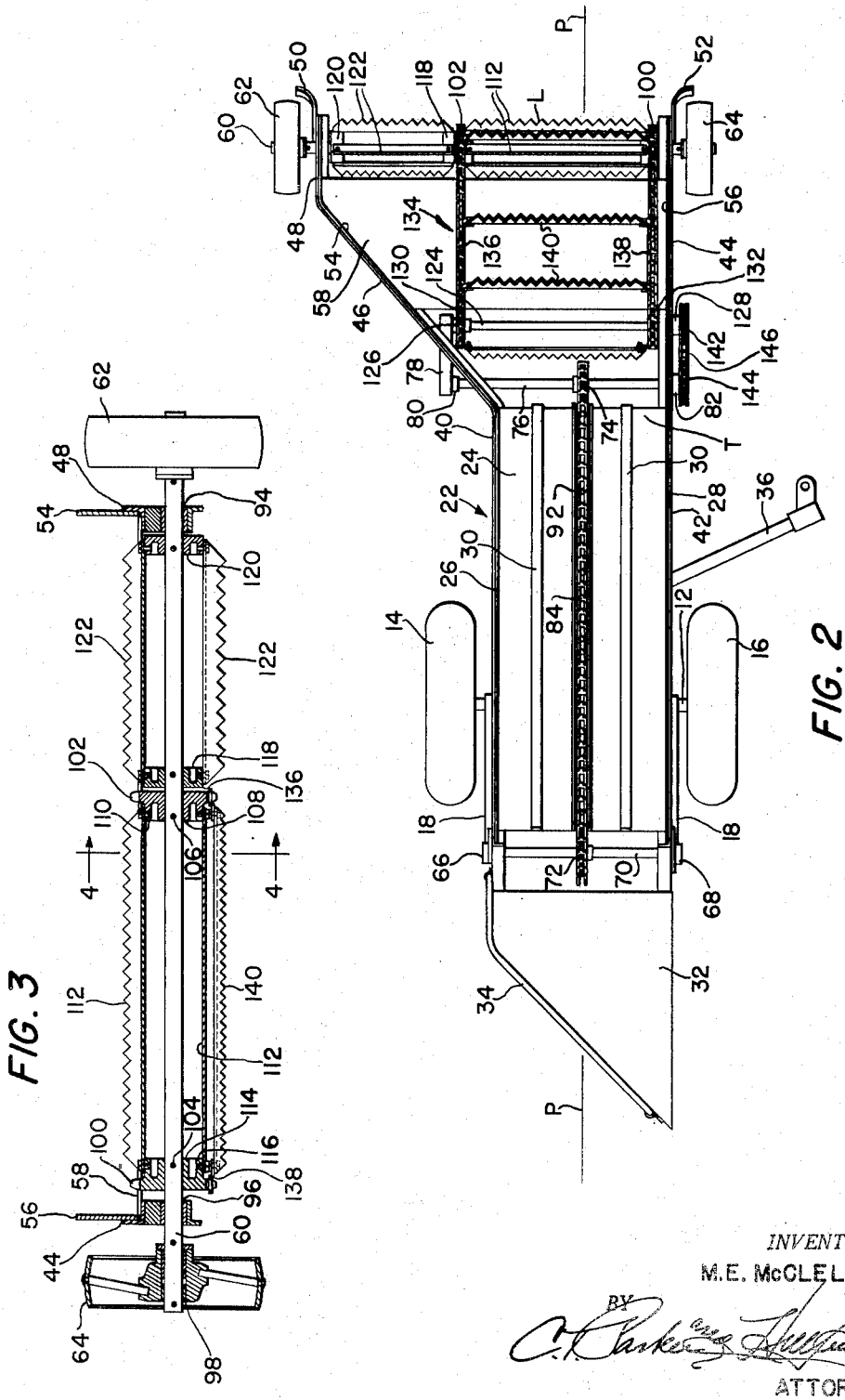

UNITED STATES PATENT OFFICE 2,612,979

BALE LOADER WITH WIDE PICKUP MEANS

Marcus E. McClellan, Ottumwa, Iowa, assignor to Deere Manufacturing Co., Dubuque, Iowa, a corporation of Iowa Application February 2, 1950, Serial No. 141,933

9 Claims. (Cl. 198—9)

This invention relates to a bale loader of the type adapted to be advanced over a field for picking up and loading bales of hay or like material that have been previously formed by a baling machine and discharged by such machine generally along a line parallel to the path of movement of the baling machine.

In the baling of hay, straw or other crop material it is conventional practice to first cut the material and leave it lying on the ground, after which the material is formed into windrows by a side-delivery rake or other machine, the windrows being so formed as to lie in parallel rows or lines across the field. Subsequently, a mobile baling machine equipped with material-pick-up means, is drawn successively along the windrows to pick up the windrows and to deliver the material therefrom to a baling chamber in which bales are formed. In one type of so-called pick-up baler, the chamber in which the bales are formed extends parallel to the line of travel and bales are discharged rearwardly therefrom. The average bale is substantially longer than it is wide and when discharged from a baler of the type referred to will lie on the ground lengthwise along a path parallel to that traveled by the baler. In another type of baler, the bale-forming chamber is disposed transverse to the line of travel. In such type of baler, the bales will be discharged to one side of the machine and will theoretically lie along a path parallel to that traveled by the machine, except in this case the bales will be crosswise of such path; although in some machines, bale-discharge means are provided for turning the bales lengthwise as they are discharged. In either type of machine, the bales will normally lie randomly lengthwise and crosswise of such path, since the bale-discharge end of the bale-forming chamber is at a substantial height above the ground and the bales, in tumbling from the discharge means, cannot normally be expected to assume perfect positions on the ground.

A further part of the conventional practice is to utilize a bale loader for picking up the bales and for loading these bales on a wagon or trailer. In some cases, the wagon or trailer and bale-pick-up means is drawn behind or alongside the baler so that the bales can be picked up successively as discharged. In other cases, the pick-up and loading operation is conducted after the baling operation is completed. In either case, the problem of picking up and loading the bales is complicated somewhat by the imperfect disposition of the bales on the ground.

Conventional bale-pick-up means and loaders are known, which comprise, in a typical construction, an elongated upwardly and rearwardly inclined conveyor of sufficient width to receive a bale lengthwise but not crosswise thereof. The leading portion of the side members constituting the channel up which the bales move is flared outwardly to accommodate misalined bales on the ground. However, these loaders are subject to the disadvantage that the rearwardly converging flared or guide portions are symmetrical with the bale-receiving throat of the conveyor and it often occurs that a bale disposed transverse to the pickup path will become wedged between these portions, whereupon it becomes necessary for the operator to manually turn the bale so that it can be carried up the conveyor.

According to the present invention, the bale loader is provided with improved bale-pick-up means that eliminates the disadvantage referred to above because of the provision of a bale-pick-up portion that is laterally offset to only one side of the rearwardly and upwardly moving bale conveyor. The pick-up means is of sufficient width to receive a bale either crosswise or lengthwise thereof. The improved means operates on the fundamental principle of first picking up the bale and then turning it from a crosswise to a lengthwise position so that it may be readily received by the bale conveyor. In other words, the present invention discards the principle of attempting to straighten or aline the bale while it is lying on the ground, thereby eliminating the difficulties characteristic in the operation of known loaders.

A further object of the invention is to provide bale-engaging means extending substantially across the entire width of the pick-up portion, which means includes bale-engaging elements or members adapted to engage a crosswise bale to move such bale rearwardly upon a bale-supporting portion of the pick-up means. Means is provided on the pick-up means for retarding one end of the bale and additional means is provided on the pick-up means for engaging the other end of the bale to turn a crosswise bale lengthwise for entry to the throat of the bale conveyor.

In general, it is an object of the present invention to provide an improved and simplified bale loader that will function efficiently in the accomplishment of the purposes for which intended.

The foregoing and other important objects and desirable features inherent in and encompassed by the invention will become apparent to those versed in the art as a complete disclosure of a preferred embodiment of the invention is made in the following detailed description and accompanying sheets of drawings in which:

Figure 1 is a side view of the bale loader, the near rear wheel having been removed to expose certain driving parts;

Figure 2 is a plan view of the loaders;

Figure 3 is a transverse sectional view, on an enlarged scale, taken substantially along the line 3—3 of Figure 1;

Figure 4 is a fragmentary sectional view, on an enlarged scale, taken substantially along the line 4—4 of Figure 3; and Figures 5, 6 and 7 are schematic views showing successive steps in the picking up and turning lengthwise of a crosswise bale.

To a considerable extent, and especially as viewed from the side, the bale loader illustrated is or may be largely conventional. It comprises essentially a longitudinally extending frame 10 having at its rear end a transverse axle 12 at opposite ends of which are carried ground-engaging wheels 14 and 16. The right-hand wheel 16 has been omitted from Figure 1. These wheels provide means for carrying the frame 10 and associated parts for advance over the field.

The frame 10, through appropriate braces 18 and 20, carries a rearwardly and upwardly inclined conveyor frame 22 which has a bottom 24 and opposite lengthwise side walls or guide elements 26 and 28. The bottom 24 is provided with parallel lengthwise bale-supporting strips 30. The upper end of the conveyor frame structure 22 leads to a substantially horizontal platform 32 which has a guard rail or deflector 34. Bales that move upwardly over the bottom 24 and between the side walls or guide portions 26 and 28 are transferred to the platform 32 and, because of the angularity of the guard rail 34 (Fig. 2), the bale will be deflected toward the right. Figure 2 shows that the machine is provided with a laterally extending hitch bar 36 by means of which the machine may be connected to and drawn by a tractor or other propelling vehicle.

The platform is appropriately reenforced by a brace 38.

The conveyor frame 22 is made up of a left-hand frame member 40 and a right-hand frame member 42. As best shown in Figure 2, the right-hand frame member 42 extends longitudinally straight ahead to provide a continuation frame portion 44. The left-hand frame member 40 turns laterally outwardly to the left, at 46, and then is turned straight ahead at 48 to provide a side portion parallel to the portion 44. The forward part of the portion 48 is flared outwardly, at 50, and the forward portion of the extension frame 44 is symmetrically flared at 52. Although the forward portion at 52 is substantially in longitudinal alinement with the side wall 28 of the conveyor 22, the forward portion 48—50 at the left side of the machine is laterally offset relative to the side wall 26 of the conveyor 22. The side walls 26 and 28 are spaced apart a distance sufficient to receive therebetween a bale disposed lengthwise but not crosswise of the conveyor frame. However, the transverse spacing between the portions 48 and 44 is sufficient to receive a bale crosswise therebetween.

That portion of the machine comprising the forward extensions 44 and 46, together with associated parts to be described, comprises bale-pick-up means for picking up bales from the ground and for facilitating the delivery or transfer of such bales to the conveyor structure 22. The pick-up means has forwardly diverging side walls 54 and 56 associated respectively with the frame extensions 46 and 44 and adjoining respectively the conveyor side walls 26 and 28. The pick-up means further includes a bottom or floor element 58 which provides a bale-supporting portion for purposes to presently appear.

The pick-up means is carried at its forward end by means of a transverse axle or shaft 60 on opposite ends of which are journaled relatively small carrying wheels 62 and 64. Since the frame 10 and the conveyor structure 22 and pick-up means frame members 44 and 46 are rigidly joined and braced, the entire loader is carried on the wheels 14 and 16 at its rear end and the wheels 62 and 64 at its front end, thus rendering the machine mobile so that it may be conveniently drawn behind or alongside a wagon or trailer. It will be understood that in the present instance a trailer is drawn along with the loader in such position that bales may be discharged from the loader platform 32 directly to the bed of the trailer or box of the wagon, as is conventional.

The upper end of the conveyor frame members 26 and 28 are provided respectively with bearings 66 and 68 which journal therebetween a transverse shaft 70 on which is keyed a sprocket 72. This sprocket is located intermediate the ends of the shaft 70 and centrally of the transverse dimension of the conveyor structure 22, and is further in longitudinal alinement with a sprocket 74 keyed intermediate the ends of a transverse shaft 76 located at the junction of the conveyor structure 22 and the pick-up means (Fig. 2). A support 78 carried by the left-hand extension frame member 46 provides a bearing at 80 for one end of the shaft 76 and the other end of this shaft is carried in an appropriate bearing at 82 supported by the forward end portion of the right-hand conveyor frame member 28.

An endless, bale-conveying chain 84 is trained about the sprockets 72 and 74, about a pair of idler sprockets 86 and 88 and about a driving sprocket 90. The sprocket 90 is keyed to the axle or shaft 12 and thus is driven by the wheels 14 and 16 as the loader is advanced over the ground. The idler sprockets 86 and 88 are journaled respectively behind and ahead of the sprocket 90 (Fig. 1). The particular arrangement illustrated is provided for the purpose of driving the chain 84 in the proper direction to move bales upwardly on the conveyor structure 22. The upper run of the chain travels in an elongated channel member 92 carried by the bottom 24 of the conveyor structure 22 (Fig. 2).

As best shown in Figure 3, the shaft or axle 60, on which the wheels 62 and 64 are journaled, is itself journaled in bearings 94 and 96 respectively at the left-hand and right-hand sides of the pick-up means. The right-hand wheel 64 has been shown in section in this figure to illustrate a bearing 98 for journaling the wheel. It will be understood that a similar bearing (not shown) is provided for the left-hand wheel 62.

The shaft 60 carries and serves as part of bale-engaging means for facilitating the picking up of bales from the ground and the transferring of such bales to the bale-supporting portion 58 and other elements to be described below. This means comprises a rotary element here shown as including two coaxial sections; although, it will be obvious that a single rotary element could be substituted for that shown. The first section of the rotary element or means comprises a pair of axially spaced carriers or sprockets 100 and 102 fixed to the shaft 60 respectively by pins 104 and 106. As best shown in Figure 4, the sprocket or carrier 102 has, in addition to a hub portion 108 for mounting on the shaft 60, an octagonal portion 110 on four sides of which are carried the ends of a plurality of transverse bale-engaging members 112, each of which is in the form of an angle bar having one of its flanges extending radially as respects the axis of the shaft 60, which flange is notched or serrated (Figs. 2 and 3) to make each bar sufficiently aggressive in its bale-handling function. The other carrier-sprocket 100 has a hub portion 114 and an octagonal mounting portion 116 on four sides of which are mounted the opposite ends of the bars 112. This part of the rotary means is thus in the form of a skeleton structure keyed to the shaft 60 by the pins 104 and 106.

The coaxial section of the rotary means comprises a companion skeleton structure made up of a pair of axially spaced carrier members 118 and 120 similar to the members 100 and 102, except having no sprocket teeth. The carrier members 118 and 120 carry transversely extending, bale-engaging members or bars 122 which, like the bars 112, are in the form of angle members having notched or serrated flanges. The two coaxial sections of the rotary means are preferably arranged so that the angular spacing of the bars 112 is coincident with the angular spacing of the bars 122.

It will be noted from the description thus far that the cylindrical skeleton structure provided by the rotary means establishes for the pick-up means a transverse leading portion of sufficient width to receive therebetween a bale lying transverse to the line or path along which the loader is moved in its bale-pick-up operation. For the purposes of general amplification of the disclosure, further reference is made to Figures 5, 6 and 7 wherein the principal parts of the loader are illustrated schematically in the successive steps involved in picking up a transverse bale. In these figures, the letter P designates generally the pick-up path along which the loader moves. The numeral 22 designates generally the bale conveyor and the numerals 54 and 56 designate the forwardly diverging side walls of the pick-up structure. The letter L designates the leading portion of the pick-up means. A transverse bale is shown in Figure 5 and is designated by the letter B. Figure 5 illustrates the relationship between the loader and the bale prior to the picking-up operation of the bale. Figure 6 shows how the bale is moved upwardly onto the pick-up means and Figure 7 shows how the bale has been turned lengthwise for entry into the throat of the conveyor 22 defined by the closely spaced apart side wall elements 26 and 28. Further reference will be had to these figures for clarification of the disclosure in view of the operating elements to be described below.

A shaft 124 is disposed in closely spaced relationship to and parallel with the shaft 76. This shaft has its opposite ends journaled respectively in bearings 126 and 128 at opposite sides of the pick-up means frame structure and further has keyed thereto a pair of axially spaced sprockets 130 and 132 which are respectively in longitudinal alinement with the carrier sprockets 102 and 100 on the shaft 60. Bale-advancing means in the form of a conveyor 134 is associated with these four sprockets and preferably comprises a pair of chains 136 and 138 between which are fixed longitudinally spaced, transversely extending bars or members 140 having notched or serrated flanges for engaging bales. It will be noted from an examination of Figure 4 that the spacing of the bars 140 is such that the bars 140 are between the bars 112 as the means 134 travels about the rotary means 100—102—112. It will be further noted that the bars 140, as they pass about the rotary means, have additionally the function of engaging a bale lying on the ground so that they assist the members 112 in the picking up of such bale.

The shaft 124 projects at its right-hand end beyond the associated frame extension member 44 and has keyed thereto a sprocket 142. This sprocket is in alinement with a similar sprocket 144 keyed to the right-hand projecting end of the shaft 76. A short endless chain 146 is trained about the sprockets 142 and 144 and serves as means for transmitting drive to the bale-advancing means 134 from the ground wheels 14 and 16 via the bale-conveying chain 84.

*Operation*

As suggested above, the conventional bale loader may be drawn over a field either directly behind a baler or separately and subsequent to the baling operation. In the first case, the loader is expected to pick up bales as they are discharged onto the ground by the baler. In the second case, the bales are lying generally along a pick-up path and these bales are expected to be successively picked up by the loader. In either case, generally the same problems are involved; that is, the bales will lie randomly lengthwise and crosswise of the pick-up path; some of the bales will be perfectly disposed either transversely or lengthwise of the path, and others will lie at various angles to the path.

In the advance of the loader, the pick-up means is positioned with respect to the pick-up path as illustrated in the drawings. This is, the portion of the pick-up means directly ahead of the bale conveyor 22 is centered on the path and the laterally offset left-hand portion or area of the pick-up means is to the left of the path. This is brought out in Figures 2, 5, 6 and 7. In the case of a bale that is lying perfectly lengthwise of the path, little difficulty is involved, since such bale will be picked up by the bars 112 and moved rearwardly onto the bale-supporting portion of the pick-up means comprising the bale-advancing means 134 and that portion of the floor or bottom 58 directly therebelow. The bale-advancing means will move the bale rearwardly into the throat designated generally by the letter T in Figures 2, 5, 6 and 7. The bale-conveying chain 84 will then move the bale upwardly on the conveyor 22 to the discharge platform 32, at which point the deflector or guard rail 34 will turn the bale for discharge over the right-hand end of the platform 32 onto a wagon or trailer towed along with the loader. In this respect, it may be said that the present loader functions in a conventional manner.

However, in instances in which the bales are disposed transversely or angularly with respect to the pick-up path, the present loader has material advantages over known loaders. Primarily, as stated above, the present loader operates on the principle of first picking up the bale and then turning it lengthwise for entry into the throat T. No attempt is made to rearrange the bale while it is lying on the ground. In this manner, the present loader avoids wedging of the bales in the pick-up means.

Specifically, and referring particularly to Figures 2, 5, 6 and 7, a transversely disposed bale is encountered by the pick-up means which, being sufficiently wide to receive the crosswise bale, lifts the bale and moves it rearwardly onto the relatively wide bale-supporting portion comprising the entire floor 58 and bale-advancing means 134. It will be noted that the pick-up means comprises a substantial area but movable bale-handling means are not provided over the entire area. That is to say, the bale-advancing means 134 moves along the right-hand portion of this area and the bale-pick-up means comprising the left-hand section of the rotary means (118—120—122) operates only at the forward and left-hand portion of the area. Hence, the bale is engaged completely across the leading portion of the pick-up means until it is above and to the rear of the rotary means. The left-hand end of the bale will encounter the rearwardly and inwardly inclined side wall 54, whereas the right-hand end of the bale will be carried by the bale-advancing means 134. Therefore, the right-hand end of the bale will move toward the throat T so that ultimately the bale is turned lengthwise. This function will be apparent from a comparison of Figures 6 and 7.

Should the bale be lying parallel to the path P but offset considerably to the left so that it is received directly by the portion of the rotary means comprising the bars 122, this portion of the rotary means will move the bale rearwardly until the end of the bale encounters the inclined wall 54. The combination of the forward travel of the loader and the rearward force applied by the rotary means will cause the bale to be transferred laterally in part to the bale-advancing means 134. Thereupon, the latter will move the bale toward the throat T and the function of the loader will continue in the same manner as if the bale were originally lying transverse to the pick-up path.

Since there is a considerable lapse in time between the completion of successive bales by the baler, there will be an appreciable interval or distance between successive bales lying along the ground. Hence, it will be normally expected that the pick-up means will clear or turn one bale for entry into the throat T before the leading portion thereof encounters a succeeding bale.

Various features and capabilities of the loader described herein, other than those specifically enumerated above, will undoubtedly occur to those versed in the art, as will numerous modifications and alterations in the preferred embodiment of the invention disclosed, all of which may be achieved without departing from the spirit and scope of the invention as defined in the appended claims.

What is claimed is:

1. A bale-handling machine for picking up from the ground bales of material such as hay, straw or the like, which bales have greater length than width and which lie on the ground generally along but randomly lengthwise and crosswise of a pick-up path, comprising: a frame; means carrying the frame for advance along said path; bale-receiving means on the frame having a forwardly disposed bale-receiving throat of sufficient width to receive a bale lengthwise but not crosswise thereof and a pair of guide elements extending rearwardly from said throat, said guide elements being parallel and spaced apart transversely on the order of the width of the throat; bale-gathering means connected to the frame ahead of said throat and including a first side wall element extending generally straight ahead from the throat substantially as an extension of one of said guide elements and having a front end portion in longitudinal alinement with said one guide element, and a second side wall having a rear end portion adjoining the throat in longitudinal alinement with the other of said guide elements and further having a front end portion laterally offset outwardly relative to said other guide element and transversely alined with and transversely spaced from the front end portion of said first side wall element a distance sufficient to receive a bale crosswise therebetween; bale-pick-up means extending substantially completely across between the front end portions of the side wall elements and operative to move a bale rearwardly between said side wall elements; and means of less effective width than the pick-up means and movable rearwardly immediately behind that portion of the pick-up means ahead of the throat, for receiving a bale from the pick-up means and for advancing the bale to the throat.

2. The invention defined in claim 1, further characterized in that: the pick-up means is a rotary device rotatable on a transverse axis between the front end portions of the side wall elements; and the bale-moving means is a longitudinally rearwardly running conveyor extending from that portion of the rotary device ahead of the throat rearwardly to the throat.

3. The invention defined in claim 1, further characterized in that: said second side wall element inclines forwardly and outwardly from its rear end portion to its front end portion so that the side wall elements define a bale-receiving area including a contiguous generally triangular bale-supporting area portion offset laterally from the bale-receiving throat to the same side as the front end portion of the second side wall element; and the bale-moving means is confined to portions of said bale-receiving area apart from said generally triangular area portion.

4. A bale-handling machine for picking up from the ground bales of material such as hay, straw or the like, which bales have greater length than width and which lie on the ground generally along but randomly lengthwise and crosswise of a pick-up path, comprising: a frame; means carrying the frame for advance along said path; bale-receiving means on the frame having a forwardly disposed bale-receiving throat of sufficient width to receive a bale lengthwise but not crosswise thereof and a pair of guide elements extending rearwardly from said throat, said guide elements being parallel and spaced apart transversely on the order of the width of the throat; bale-gathering means connected to the frame ahead of said throat and including a first side wall element extending generally straight ahead from the throat substantially as an extension of one of said guide elements and having a front end portion in longitudinal alinement with said one guide element, and a second side wall having a rear end portion adjoining the throat in longitudinal alinement with the other of said guide elements and further having a front end portion laterally offset outwardly relative to said other guide element and transversely alined with and transversely spaced from the front end portion of said first side wall element a distance sufficient to receive a bale crosswise therebetween; and bale-engaging means movable rearwardly between the side wall elements in longitudinal alinement with the throat and extending rearwardly from the front end portion of the bale-gathering means to the throat for moving a bale from the bale-gathering means to the bale-receiving means.

5. A bale-handling machine for picking up from the ground bales of material such as hay, straw or the like, which bales have greater length than width and which lie on the ground generally along but randomly lengthwise and crosswise of a pick-up path, comprising: a frame; means carrying the frame for advance along said path; a bale conveyor on and extending longitudinally of the frame for substantial alinement with said path as the frame advances, and having a portion thereof in the form of a longitudinal channel defined by outer side wall elements spaced apart a distance sufficient to receive a bale lengthwise but not crosswise therebetween; said conveyor having a forward bale-pick-up element including a front portion of sufficient width to receive a bale crosswise thereof, said element having a first bale-receiving area directly ahead of the channel and behind said front portion, and a second, contiguous bale-receiving area offset to only one side of and forwardly of said channel and behind said front portion; one of said side wall elements having a straight-ahead extension bordering the outer edge of the first area and extending to the outer end of the front portion; the other of said side wall elements having an extension directed outwardly and forwardly and bordering the outer edge of the second area and extending to said front portion; rearwardly moving means entirely across said front portion and effective to move a crosswise bale onto both of said areas; and rearwardly moving means extending from and over the first area to said channel for engaging such bale and turning it lengthwise to be received by said channel.

6. A bale-handling machine for picking up from the ground bales of material such as hay, straw or the like, which bales have greater length than width and which lie on the ground generally along but randomly lengthwise and crosswise of a pick-up path, comprising: a frame; means carrying the frame for advance along said path; a bale conveyor on and extending longitudinally of the frame for substantial alinement with said path as the frame advances, and having a portion thereof in the form of a longitudinal channel defined by outer side wall elements spaced apart a distance sufficient to receive a bale lengthwise but not crosswise therebetween; said conveyor having a forward bale-pick-up element including a front portion of sufficient width to receive a bale crosswise thereof, said element having a first bale-receiving area directly ahead of the channel and behind said front portion, and a second, contiguous bale-receiving area offset to only one side of and forwardly of said channel and behind said front portion; first means forming substantially a straight-ahead extension of one of said side wall elements and bordering the outer edge of the first area and extending to the outer end of the front portion; second means associated with the other of said side wall elements and forming an extension thereof directed outwardly and forwardly and bordering the outer edge of the second area and extending to said front portion; means on said pick-up element effective to move a crosswise bale onto both of said areas; and means on the conveyor for engaging such bale and turning it lengthwise to be received by said channel.

7. A bale-handling machine for picking up from the ground bales of material such as hay, straw or the like, which bales have greater length than width and which lie on the ground generally along but randomly lengthwise and crosswise of a pick-up path, comprising: a frame; means carrying the frame for advance along said path; bale-receiving means on the frame having a forwardly disposed bale-receiving throat of sufficient width to receive a bale lengthwise but not crosswise thereof and a pair of guide elements extending rearwardly from said throat, said guide elements being parallel and spaced apart transversely on the order of the width of the throat; bale-gathering means connected to the frame ahead of said throat and including a pair of side wall elements diverging forwardly and outwardly from the throat to form a bale-pick-up area sufficiently wide to receive a bale crosswise thereon; means effective across the entire width of the bale-pick-up area for moving either lengthwise or crosswise bales rearwardly from the ground and into said area; and means operating rearwardly over said area toward the throat and offset to one side only of the pick-up means for moving bales from said area lengthwise into the throat.

8. A bale-handling machine for picking up from the ground bales of material such as hay, straw or the like, which bales have greater length than width and which lie on the ground generally along but randomly lengthwise and crosswise of a pick-up path, comprising: a frame; means carrying the frame for advance along said path; bale-receiving means on the frame having a forwardly disposed bale-receiving throat of sufficient width to receive a bale lengthwise but not crosswise thereof; bale-pick-up means carried by the frame in advance of and in bale-transfer communication with the throat, and having a bale-supporting portion of sufficient width to receive a bale crosswise thereof; said pick-up means including an element for effecting movement of bales from the ground to the bale-supporting portion, whether such bales are lengthwise or crosswise of the aforesaid path; said pick-up means further having means alined with the throat and movable rearwardly relative to the bale-receiving means for advancing a bale from said bale-supporting portion of the pick-up means to the bale-receiving throat; and said pick-up means including means offset laterally to one side only of the throat for retarding one end portion of a crosswise bale while the opposite end portion of such bale is moved rearwardly by said throat-alined movable means so that such bale is turned lengthwise for entry to the throat.

9. A bale-handling machine for picking up from the ground bales of material such as hay, straw or the like, which bales have greater length than width and which lie on the ground generally along but randomly lengthwise and crosswise of a pick-up path, comprising: a frame; means carrying the frame for advance along said path; bale-receiving means on the frame having a forwardly disposed bale-receiving throat including sides spaced apart sufficiently to receive a bale lengthwise but not cross-wise therebetween; bale-pick-up means carried by the frame in advance of and in bale-transfer communication with the throat, and having a transverse leading portion of sufficient width to receive a bale crosswise thereof; means coextensive with and across substantially the entire width of said leading portion, including bale-engaging elements movable rearwardly relative to said leading portion for engaging and moving either a lengthwise or a crosswise bale rearwardly over said leading portion; means carried by the frame and offset to one side only of the pick-up means for engaging one end only of a crosswise bale for moving only that end of such crosswise bale toward the throat at a certain speed; and means carried by the frame and offset to the other side only of the pick-up means for engaging the opposite end only of the crosswise bale for causing only said opposite end of the crosswise bale to trail the first end of said bale so that the crosswise bale is turned lengthwise for entry to the throat.

MARCUS E. McCLELLAN.

REFERENCES CITED

The following references are of record in the file of this patent:

UNITED STATES PATENTS

| Number | Name | Date |
|---|---|---|
| 1,005,126 | Battee | Oct. 10, 1911 |
| 1,258,142 | Pitcher | Mar. 5, 1918 |
| 1,406,946 | Eiler | Feb. 14, 1922 |
| 1,700,294 | Levin | Jan. 29, 1929 |
| 1,726,604 | Amen | Sept. 3, 1929 |
| 2,312,779 | Smith | Mar. 2, 1943 |
| 2,325,833 | Cook | Aug. 3, 1943 |
| 2,410,238 | Ringrose | Oct. 29, 1946 |